United States Patent Office 2,935,377
Patented May 3, 1960

2,935,377

STARCH-BORAX SETTLING AID AND PROCESS OF USING

Robert L. Jones, Baton Rouge, La., assignor to Kaiser Aluminum & Chemical Corporation, Oakland, Calif., a corporation of Delaware No Drawing. Application August 23, 1957
Serial No. 680,028

29 Claims. (Cl. 23—143)

This invention relates to the treatment of aluminous ores for the recovery of alumina values therefrom according to the Bayer process. More particularly this invention relates to the settling of insoluble ore materials from a caustic aluminate liquor containing the alumina values dissolved therein. In particular the invention relates to the preparation of novel settling agents and their addition to caustic aluminate liquors to remove the insoluble ore materials suspended therein.

In the Bayer process for the production of alumina, aluminous ores are digested in a caustic liquor wherein the alumina is dissolved by the liquor and the insoluble ore materials remain undissolved and suspended in the liquor in a finely divided form. With bauxite ore, the insolubles are primarily hydrated iron oxide, titania, and silicates. It is necessary to remove the insoluble ore materials before recovery of alumina from the caustic aluminate liquor stream by precipitation.

The removal of the insoluble ore materials from a caustic aluminate liquor resulting from the digestion of aluminous ores has been accomplished heretofore by the addition of starch in an amount which will settle the suspended insoluble particles. The sedimentation and removal of these insoluble ore materials results in a clarified caustic aluminate liquor which is subsequently passed to the precipitation phase of the process for the recovery of the contained alumina. The preparation of starch is accomplished by cooking the starch in a heated caustic solution usually at a temperature below 150° C. The purpose of this is to solubilize the starch in the caustic solution so that it may be added to the caustic aluminate liquor containing the suspended insoluble ore materials. The use of starch as a settling agent is disclosed in Patent Number 2,280,998 to Ralph Waldo Brown.

The use of starch as a settling agent was found to be very advantageous in flocculating the insoluble ore materials and gained wide acceptance in the alumina industry. However, it is desirable to minimize the amount of starch used for settling purposes, since the addition of starch to the process adds a material to the caustic aluminate liquor which contaminates the circulating liquor. The high temperature used in the digestion step of the process causes a degradation of the starch molecule to lower molecular weight organics which tend to go into solution. These lower molecular weight organics are mainly sodium compounds and reduce the amount of free soda in the liquor. Furthermore, it is believed that their presence in the liquor has a detrimental effect in certain phases of the process, such as in the clarification and precipitation steps. It would be desirable to use a settling agent which would require lesser amounts of starch to be added for clarifying the circulating caustic aluminate liquors. The present invention contemplates a settling aid used in conjunction with the starch which reduces the amount of starch required and also has the beneficial unexpected effect of increasing the sedimentation rate of the insobuble ore materials over that obtainable by the use of starch alone.

Therefore, it is an object of this invention to prepare a solubilized starch solution containing a settling aid which increases the rate of sedimentation of the insoluble ore materials from the caustic aluminate liquor.

It is another object of this invention to prepare a settling aid composition comprised of an additive used in conjunction with starch which reduces the amount of starch required for the settling of the insoluble ore materials from the caustic aluminate liquor.

It is a further object of this invention to remove the insoluble ore materials from caustic aluminate liquors by using the novel settling aid of this invention so as to obtain not only an increased percent solids in the underflow from the settlers used in settling the ore insolubles but also a clearer settler overflow.

It is another object of the invention to prepare a settling agent used in settling insoluble ore materials from caustic aluminate liquors which requires lower heat and cooking time requirements in the preparation thereof compared to the use of starch alone.

It is another object of this invention to reduce the total cost of the overall settling operation.

It has now been found that the addition of controlled amounts of a boron compound to the starch used to settle the ore insolubles results in an improved settling aid composition. The addition of a boron compound as a settling aid to the starch results in increased mud settling rates with a substantial reduction in the amount of starch required. The use of such a settling composition results in an increased percent solids in the mud settler underflows and in clearer mud settler overflows.

Many boron compounds are suitable for use as settling aids with the starch. In particular, sodium tetraborate or any of its hydrated compounds such as borax, are especially suitable. Among other useful boron compounds are boric anhydride, boric acid and sodium metaborate. Although the sodium salts of the boron compounds are preferred, it is within the scope of this invention to use other boron salts such as the potassium or calcium salts of the boron compounds. Selection of the boron compound to be used should take into consideration the contamination factor. In alumina production from caustic aluminate liquors, it is undesirable to introduce foreign ions into the liquor. Thus, the addition of the boron compound introduces boron, however its effect appears to be negligible. It is preferred to add a boron compound which does not contain an additional foreign ion. Sodium tetraborate compounds are very effective settling aids and their use would not contaminate the liquor with a foreign ion other than the boron. The invention will be hereinafter described with these as the exemplary and preferred boron compounds to be used. The sodium tetraborate compounds used may be the anhydrous compound ($Na_2B_4O_7$), the penta-hydrate compound $$(Na_2B_4O_7.5H_2O)$$

or the decahydrate compound ($Na_2B_4O_7.10H_2O$) which is commercial borax. The term "starch-borax" as used herein is a generic term meaning the combination of starch with either $Na_2B_4O_7$, 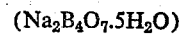 or $$Na_2B_4O_7.10H_2O$$

or any other hydrated compound of 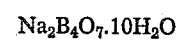. The decahydrated compound is generally termed borax but the other compounds listed also have been gtiven the name borax (e.g. $Na_2B_4O_7$ is anhydrous borax.) Thus, the word borax in the term starch-borax may mean any one of the various sodium tetraborate compounds since they are interchangeable (stoichiometrically) for producing the results desired. The data herein which show recommended quantities of sodium tetraborate penta-hydrate or equivalent amounts of commercial borax can be used to calculate the equivalent amounts of other boron compounds which can be used, such as boric anhydride and anhydrous borax. The sodium tetraborate penta-hydrate used with the starch may vary in amounts up to about 6% of the weight of the starch. Amounts as low as about 2% are practical in plant practice and an optimum range is between 4 and 5% for the sodium tetraborate pentahydrate. The amounts of other sodium tetraborate compounds to be used with the starch will vary accordingly and may be determined by calculations based on stoichiometric equivalents. For example, by calculation, 6.55% sodium tetraborate decahydrate is the stoichiometric equivalent of 5% sodium tetraborate pentahydrate.

The starch used in the starch-borax mixtures added to the caustic aluminate liquors containing the muds may vary in amounts up to about 0.5% of the weight of the mud to be settled with optimum amounts in the range of 0.3 to about 0.5%.

The test work herein described was carried out using muds resulting from Jamaican bauxite. The same beneficial effects of the starch-borax settling aid would apply to Surinam or other bauxite muds but with different settling aid charging requirements. For example, for a Surinam mud the settling aid requirements may be less than the requirements for Jamaican muds because of their chemical and physical nature. The use of stoichiometric equivalents of sodium tetraborate compounds with starch produces substantially identical settling results. Stated otherwise, the equivalent weights are substantially equal in their synergistic properties.

Any starch may be used in the process of this invention. Potato and corn starch are widely used because of their availability. Maine potato starch and a commercial pearl corn starch in particular were used herein in the exemplary data.

The preparation of the settling aid composition of this invention requires certain procedures in order to insure that a homogeneous, smooth-flowing solution is formed. A starch-borax suspension is added to a hot caustic soda solution. A starch suspension can be made in cold water and the borax added to the starch suspension or the starch and borax may be mixed dry before addition to the cold water. The starch-borax suspension in cold water is then mixed with the hot caustic solution as recited above. The starch concentration in the final solution varies between 20 and 60 grams per liter, and the final caustic concentration varies between 10 and 200 grams per liter. The borax concentration varies as recited above. This composition is then cooked at a temperature between 85 and 100° C. with an optimum nearer 85° C. for a period of 5–15 minutes. This produces a settling aid composition which is of the proper consistency and manageability to be added to the caustic aluminate stream containing the insoluble ore materials to be settled. Care must be taken in the preparation of the settling aid composition to avoid the formation of a gel or a thickened solution. Following the procedures outlined above to prepare the composition will avoid these undesirable conditions.

The following results are representative of the beneficial effects of using borax as a settling aid and are based upon tests in which addition of the settling aid was made to a caustic aluminate liquor-Jamaican mud slurry having the following composition:

$Al_2O_3$ ---------------------------------garms/liter-- 114
Caustic [1] ------------------------------------do---- 175
Ore insolubles ---------------percent by weight-- 3–4

[1] The sodium carbonate equivalent of the sum of the sodium aluminate and free sodium hydroxide.

The settling rates are determined as follows:

One liter graduated cylinders filled to the 1000 ml. mark are used as the settling vessels in the test work. The average settling rate is determined by measuring the rate of subsidence of the top of the mud layer between the 800 ml. and 500 ml. marks on the cylinder. The maximum settling rate was determined by measuring the top of the mud layer subsidence rate between each 100 ml. mark and recording the fastest as the maximum rate. The calculations consisted of converting the observed ml./min. rate to the standard ft./hr. rate.

The results shown in Table 1 were obtained by using the standard cooking procedure with a five minute cooking time. For comparative purposes the effect on settling of a starch-borax mixture cooked for twenty-five minutes is also shown. This latter cooking time is normal for the standard starch without borax. As shown in the table, increases in settling rates up to 45% were realized by the addition of 4.0% sodium tetraborate penta-hydrate and also increases in settling rates up to 36% were obtained when the starch addition was cut by 10%. A point of importance which was observed throughout all of the test work was that the overflow liquor in the settling vessels appeared less cloudy where a starch-borax addition had been used as compared to those overflow liquors resulting from a straight starch addition.

TABLE 1

*Settling tests utilizing Maine potato starch and sodium tetraborate penta-hydrate*

| Settling Aid Constituents | Cooking Time, Min. | Average Rate | | Maximum Rate | |
|---|---|---|---|---|---|
| | | Rate, ft./hr. | Settling Power, Percent [c] | Rate, ft./hr. | Settling Power, percent [c] |
| 0.5% Starch [a] +2.0% $Na_2B_4O_7.5H_2O$ [b] | 5 | 8.88 | 129.1 | 10.03 | 133.7 |
| 0.5% Starch [a] +3.0% $Na_2B_4O_7.5H_2O$ [b] | 5 | 9.29 | 135.0 | 10.41 | 138.8 |
| 0.5% Starch [a] +4.0% $Na_2B_4O_7.5H_2O$ [b] | 5 | 10.03 | 145.8 | 10.94 | 145.9 |
| 0.45% Starch [a] +4.0% $Na_2B_4O_7.5H_2O$ [b] | 5 | 9.42 | 136.9 | 9.98 | 133.1 |
| 0.5% Starch [a] +4.0% $Na_2B_4O_7.5H_2O$ [b] | 5 | 10.03 | 145.8 | 10.94 | 145.9 |
| 0.5% Starch [a] +3.0% $Na_2B_4O_7.5H_2O$ [b] | 25 | 7.69 | 111.8 | 8.38 | 111.7 |
| 0.5% Starch [a] +4.0% $Na_2B_4O_7.5H_2O$ [b] | 25 | 7.81 | 113.5 | 8.81 | 117.5 |
| 0.5% Starch [a] (Standard) | 25 | 6.88 | 100.0 | 7.50 | 100.0 |

[a] Based on weight of mud to be settled.
[b] Based on weight of the starch.
[c] Percent of standard.

As stated before, the cooking time can vary from 5–15 minutes. With $Na_2B_4O_7.5H_2O$ the optimum cooking time was approximately 5 minutes. However, when using commercial borax ($Na_2B_4O_7.10H_2O$) the optimum cooking time was approximately 10 minutes. Table 2 shows the settling power of a starch-commercial borax mixture with various cooking times. At no time did the relative settling power of the starch-borax mixture drop below that of the standard corn starch.

TABLE 2

*Determination of optimum cooking time for 0.5% corn starch plus 5.24% commercial borax*

| Settling Aid Constituents | Cooking Time, Min. | Average Rate | | Maximum Rate | |
|---|---|---|---|---|---|
| | | Rate, ft./hr. | Settling Power, Percent [c] | Rate, ft./hr. | Settling Power, percent [c] |
| 0.5% Starch [a] +5.24% $Na_2B_4O_7.10H_2O$ [b] | 5 | 10.85 | 135.6 | 12.06 | 145.3 |
| 0.5% Starch [a] +5.24% $Na_2B_4O_7.10H_2O$ [b] | 10 | 11.16 | 139.6 | 11.84 | 142.7 |
| 0.5% Starch [a] +5.24% $Na_2B_4O_7.10H_2O$ [b] | 15 | 10.67 | 133.4 | 10.94 | 131.8 |
| 0.5% Starch [a] +5.24% $Na_2B_4O_7.10H_2O$ [b] | 20 | 8.70 | 108.8 | 9.55 | 115.1 |
| 0.5% Starch [a] +5.24% $Na_2B_4O_7.10H_2O$ [b] | 25 | 9.77 | 122.1 | 11.09 | 133.6 |
| 0.5% Starch [a] +5.24% $Na_2B_4O_7.10H_2O$ [b] | 30 | 9.73 | 121.6 | 10.26 | 123.6 |
| 0.5% Starch (Standard) | 25 | 8.00 | 100.0 | 8.30 | 100.0 |

[a] Based on weight of mud to be settled.
[b] Based on weight of the starch.
[c] Percent of standard.

Table 3 shows the settling results obtained by reducing the amount of starch charged to settling. Economically the goal in using borax or any other settling aid is both to improve operations and reduce cost. The major cost in raw materials for settling is starch, therefore, the greater the reduction in amount the greater the reduction in cost. The 0.5% starch addition has been used as the standard in Table 3. Based upon the settling power of 0.5% starch-commercial borax mixture, the starch may be decreased from 0.5% to 0.4%, meanwhile holding the borax at 5.24% and still having a settling aid having a greater settling power than the standard. Where these results would appear optimal from the economic standpoint, the addition of 5.24% commercial borax to the standard 0.5% starch increases the settling rates by approximately 40%.

TABLE 3

*Settling data—utilizing varied amounts of corn starch and commercial borax*

| Settling Aid Constituents | Average Rate | | Maximum Rate | |
|---|---|---|---|---|
| | Rate, Ft./hr. | Settling Power, Percent [c] | Rate, ft./hr. | Settling Power, Percent [c] |
| 0.5% Starch [a] (Standard) | 8.00 | 100.0 | 8.30 | 100.0 |
| 0.4% Starch [a] +5.24% $Na_2B_4O_7.10H_2O$ [b] | 8.80 | 110.0 | 9.71 | 117.0 |
| 0.425% Starch [a] +5.24% $Na_2B_4O_7.10H_2O$ [b] | 10.52 | 131.5 | 11.09 | 133.6 |
| 0.45% Starch [a] +5.24% $Na_2B_4O_7.10H_2O$ [b] | 10.06 | 125.8 | 12.06 | 145.3 |
| 0.5% Starch [a] +5.24% $Na_2B_4O_7.10H_2O$ [b] | 11.16 | 139.5 | 11.84 | 142.7 |

[a] Based on weight of mud to be settled.
[b] Based on weight of the starch.
[c] Percent of standard.

It is known that borax has been used as a starch additive in the textile and adhesive industries. However, in those instances, the main objective is to produce the most viscous sols or gels possible. The starch-borax formulations required for the high viscosity materials used in the adhesive and textile industries are not suitable for producing an effective settling aid, nor do they propose the same concentration of material ratios as proposed here. The following are some examples of specific embodiments of this invention. However, it is not intended that they be limiting in any sense and are merely shown as complete specific embodiments of the invention:

EXAMPLE 1

A starch suspension was prepared by adding starch to cold water. The starch suspension was then mixed with hot sodium hydroxide to give a final solution concentration of 20 grams of starch per liter and 55 grams of sodium hydroxide per liter. The solution was cooked with agitation for 25 minutes at a temperature of 100° C. The resulting starch solution is a standard settling composition used heretofore in settling insoluble muds from caustic aluminate liquors. It is used as a basis for evaluating the settling power of starch-borax settling compositions.

EXAMPLE 2

A starch-borax caustic solution was prepared by mixing starch and $Na_2B_4O_7.5H_2O$ and slurrying in cold water. The amount of borax used was 4% of the weight of the starch. The starch-borax suspension was then mixed with sodium hydroxide solution to a final solution concentration of 60 grams of starch per liter, 2.4 grams of $Na_2B_4O_7.5H_2O$ per liter, and 0.68 gram of sodium hydroxide per liter. The solution was cooked for 4.5 minutes at a temperature of 85° C. The composition produced was an unmanageable gel. The gel was extremely sticky and was practically impossible to measure for addition to the mud slurry. Therefore, this could not be used as a settling composition in the removal of insoluble ore materials from caustic aluminate liquors.

EXAMPLE 3

A starch-borax composition was prepared in the following manner. A starch suspension was prepared in water and $Na_2B_4O_7.5H_2O$ was added in the amount of 4% by weight of the starch. This mixture was then mixed with hot sodium hydroxide solution to a final concentration of 55 grams of sodium hydroxide per liter, 0.8 gram of $Na_2B_4O_7.5H_2O$ per liter and 20 grams of starch per liter. The solution was cooked for a period of 10 minutes at a temperature of approximately 85° C. The solution resulting was a smooth homogeneous free-flowing liquid which could very easily be handled and added to the caustic aluminate liquor containing the insoluble ore materials to be settled. The settling aid was added to a caustic aluminate liquor and the settling rate determined. The settling power (percentage of the standard rate) based on the standard starch settling composition of Example 1 was 128%.

EXAMPLE 4

A starch-borax composition was prepared as in Example 3 above to a final solution concentration of 30 grams of starch per liter, 160 grams of sodium hydroxide per liter, and 1.2 grams of $Na_2B_4O_7.5H_2O$ per liter. This was cooked for 15 minutes at approximately 85° C. The resulting solution was a fairly viscous fluid which tended to gel upon cooling. It was very viscous when hot. The composition was measured and transported to the mud settling vessels for settling purposes. The settling power as a percent of the standard was 119.

EXAMPLE 5

The starch-borax composition was prepared as in Example 3 to a final solution concentration of 30 grams of starch per liter, 1.2 grams of $Na_2B_4O_7.5H_2O$ per liter and 200 grams of sodium hydroxide per liter. This was cooked for 15 minutes at a temperature of approximately 90° C. The resulting solution had a high viscosity when hot and tended to gel upon cooling. The composition was measured and added to the mud settlers to settle the insoluble ore materials and had a settling power of 111% based on the standard.

EXAMPLE 6

A starch-borax composition was prepared as in Example 3 above to a final solution concentration of 60 grams of starch per liter, 2.4 grams of $Na_2B_4O_7.5H_2O$ per liter and 100 grams of sodium hydroxide per liter. The solution was cooked for 20 minutes at a temperature of approximately 90° C. The final solution had a high viscosity when hot and tended to gel upon cooling. However, it was possible to use this solution for the settling of the insoluble mud materials and it had a settling power of 125% based on the standard.

EXAMPLE 7

A starch-borax compostiion was prepared in the following manner. A starch suspension was prepared in water and $Na_2B_4O_7.10H_2O$ was added in the amount of 5.24% of the weight of the starch. This mixture was then mixed with hot sodium hydroxide solution to a final concentration of 55 grams of sodium hydroxide per liter, 1.08 grams of $Na_2B_4O_7.10H_2O$ per liter and 20 grams of starch per liter. The solution was cooked for a period of 10 minutes at a temperature of approximately 85° C. The solution resulting was a smooth homogeneous free-flowing liquid which could easily be handled and added to the caustic aluminate liquor containing the insoluble ore materials to be settled. The settling aid was added to a caustic aluminate liquor and the settling rate determined. The settling power (percentage of the standard rate) based on the standard starch settling composition of Example 1 was 139%.

EXAMPLE 8

A starch-borax composition was prepared as in Example 7 except that $Na_2B_4O_7$ (anhydrous) was used in place of the $Na_2B_4O_7.10H_2O$, in an amount equal to 3.46% of the weight of the starch, to a final solution concentration of 55 grams of sodium hydroxide per liter, 0.69 gram of $Na_2B_4O_7$ (anhydrous) per liter and 20 grams of starch per liter. The solution was cooked for a period of 10 minutes at a temperature of approximately 85° C.. A smooth homogeneous free-flowing liquid resulted which could easily be handled and added to the caustic aluminate liquor containing the insoluble ore materials to be settled. The settling aid was added to a caustic aluminate liquor and the settling rate determined. The settling power (percentage of the standard rate) based on the standard starch settling composition of Example 1 was 124%.

The process of the invention is very simple and economical. The reduced usage of starch (as much as 20% less) tends to minimize the adverse effects of the introduction of organic materials into the circulating caustic aluminate liquor. No special equipment is necessary for the addition of borax since standard equipment already used for solubilizing starch can be used. It is merely necessary additionally to add the borax. It furthermore has been found that upon storage of the cooked starch solution which is subsequently to be used, that if borax be mixed with the starch it has a decided preservative action upon the cooked starch solution and for this reason an additional benefit is derived from the use of borax in this invention.

It is not clearly understood why the addition of borax to the starch should result in a better settling aid with attendant beneficial results. It has been postulated that the action of the borax is to form weak cross links between the starch molecules. This action is believed to result in a better floc formation, possibly a "denser" floc.

The formation of the cross linkages would increase the apparent molecular weight of the starch mixture. It has been found that, with the right cooking conditions, the addition of borax to starch will also increase the viscosity of the sol. A slight increase in viscosity of a settling aid is beneficial in settling procedures but too high an increase with gel formation as was noted in Example 2 can be very detrimental. The proper consistency for ease in handling of the settling aid can be obtained by the exercise of the procedures recited by this invention.

What I claim is:

1. In a process of refining aluminous ores for the recovery of alumina which includes a digestion of the ores in caustic liquors to extract the alumina values and a subsequent clarification step to remove the caustic-insoluble ore materials which remain suspended in the resulting caustic aluminate liquor, the improvement in removing the said insoluble ore materials from the liquor which comprises adding to said liquor a settling aid prepared by heating for a period of about 5 to 15 minutes at a temperature of about 85 to 100° C. an aqueous mixture comprising 20 to 60 grams of starch per liter, 10 to 200 grams of caustic soda per liter, and a boron compound selected from the group consisting of sodium tetraborate, sodium tetraborate pentahydrate, sodium tetraborate decahydrate, and boric anhydride, said boron compound being present in stoichiometric weight equivalent amounts of sodium tetraborate pentahydrate of from about 2% to about 6% of the weight of the dry starch.

2. The process of claim 1 wherein the boron compound is sodium tetraborate.

3. In a process of refining aluminous ores for the recovery of alumina which includes a digestion of the ores in caustic liquors to extract the alumina values and a subsequent clarification step to remove the caustic-insoluble ore materials which remain suspended in the resulting caustic aluminate liquor, the improvement in removing the said ore insolubles from the liquor which comprises adding to said liquor a settling aid prepared by heating for a period of about 5 to 15 minutes at a temperature of about 85 to 100° C. an aqueous mixture comprising 20 to 60 grams of starch per liter, 10 to 200 grams of caustic soda per liter, and hydrated sodium tetraborate, said hydrated sodium tetraborate being present in stoichiometric weight equivalent amounts of sodium tetraborate pentahydrate of from about 2% to about 6% of the weight of the dry starch.

4. The process of claim 3 wherein the hydrated sodium tetraborate is sodium tetraborate pentahydrate.

5. The process of claim 3 wherein the hydrated sodium tetraborate is sodium tetraborate decahydrate.

6. The process of claim 3 wherein the settling aid is added to the liquor in amounts of 0.3 to 0.5% of the weight of the insoluble ore material to be settled.

7. In a process of refining aluminous ores for the recovery of alumina which includes a digestion of the ores in caustic liquors to extract the alumina values and a subsequent clarification step to remove the caustic-insoluble ore materials which remain suspended in the resulting caustic aluminate liquor, the improvement in the said liquor clarification step which comprises adding to said liquor a settling aid in amounts up to 0.5% of the weight of the insoluble ore material to be removed, said settling aid prepared by heating for a period of about 5 to 15 minutes at a temperature of about 85 to 100° C. an aqueous mixture comprising 20 grams of starch per liter, 55 grams of caustic soda per liter, and 0.8 grams of sodium tetraborate pentahydrate per liter.

8. In a process of refining aluminous ores for the recovery of alumina which includes a digestion of the ores in caustic liquors to extract the alumina values and a subsequent clarification step to remove the caustic insoluble ore materials which remain suspended in the resulting caustic aluminate liquor, the improvement in the said liquor clarification step which comprises adding to said liquor a settling aid in amounts up to 0.5% of the weight of the insoluble ore material to be removed, said settling aid prepared by heating for a period of about 5 to 15 minutes at a temperature of about 85 to 100° C. an aqueous mixture comprising 20 grams of starch per liter, 55 grams of caustic soda per liter, and 1.08 grams of sodium tetraborate decahydrate per liter.

9. In a process of refining aluminous ores for the recovery of alumina which includes a digestion of the ores in caustic liquors to extract the alumina values and a subsequent clarification step to remove the caustic-insoluble ore materials which remain suspended in the resulting caustic aluminate liquor, the improvement in the said liquor clarification step which comprises adding to said liquor a settling aid in amounts up to 0.5% of the weight of the insoluble ore material to be removed, said settling aid prepared by heating for a period of about 5 to 15 minutes at a temperature of about 85 to 100° C. an aqueous mixture comprising 20 grams of starch per liter, 55 grams of caustic soda per liter, and 0.69 grams of anhydrous sodium tetraborate per liter.

10. The process of preparing a settling aid useful in separating insoluble ore materials from a caustic aluminate liquor in the production of alumina, which comprises heating an aqueous mixture comprising 20 to 60 grams of starch per liter, 10 to 200 grams of caustic soda per liter, and a boron compound selected from the group consisting of sodium tetraborate, sodium tetraborate pentahydrate, sodium tetraborate decahydrate, and boric anhydride for a period of 5 to 15 minutes at a temperature of 85 to 100° C., said boron compound being present in stoichiometric weight equivalent amounts of sodium tetraborate pentahydrate of from about 2% to about 6% of the weight of the dry starch.

11. The process of claim 10 wherein the boron compound is anhydrous sodium tetraborate.

12. The process of preparing a settling aid useful in separating insoluble ore materials from a caustic aluminate liquor in the production of alumina which comprises heating an aqueous mixture comprising 20–60 grams of starch per liter, 10–200 grams of caustic soda per liter, and hydrated sodium tetraborate, for a period of 5–15 minutes at a temperature of 85–100° C., said hydrated sodium tetraborate being present in stoichiometric weight equivalent amounts of sodium tetraborate pentahydrate of from about 2% to about 6% of the weight of the dry starch.

13. The process of claim 12 wherein the hydrated sodium tetraborate is sodium tetraborate pentahydrate.

14. The process of claim 13 wherein the sodium tetraborate pentahydrate is added in amounts of 4 to 5% of the dry weight of the starch.

15. The process of claim 12 wherein the hydrated sodium tetraborate is sodium tetraborate decahydrate.

16. The process of claim 15 wherein the sodium tetraborate decahydrate is added in amounts of 5.24 to 6.55% of the dry weight of the starch.

17. The process of preparing a settling aid useful in separating insoluble ore materials from a caustic aluminate liquor in the production of alumina which comprises heating an aqueous mixture comprising 20 grams of starch per liter, 55 grams of caustic soda per liter, and 0.8 grams of sodium tetraborate pentahydrate per liter for a period of 5 to 10 minutes at a temperature of 85 to 100° C.

18. The process of preparing a settling aid useful in separating insoluble ore materials from a caustic aluminate liquor in the production of alumina which comprises heating an aqueous mixture comprising 20 grams of starch per liter, 55 grams of caustic soda per liter, and 1.08 grams of sodium tetraborate decahydrate per liter for a period of 5 to 10 minutes at a temperature of 85 to 100° C.

19. The process of preparing a settling aid useful in separating insoluble ore materials from a caustic aluminate liquor in the production of alumina which comprises heating an aqueous mixture comprising 20 grams of starch per liter, 55 grams of caustic soda per liter, and 0.69 grams of sodium tetraborate per liter for a period of 5 to 10 minutes at a temperature of 85 to 100° C.

20. A homogeneous, free flowing, settling aid useful in separating insoluble ore materials from a caustic aluminate liquor in the production of alumina, which consists essentially of the aqueous reaction product of 20 to 60 grams of starch per liter, 10 to 200 grams of caustic soda per liter, and a boron compound selected from the group consisting of sodium tetraborate, sodium tetraborate pentahydrate, sodium tetraborate decahydrate, and boric anhydride, said boron compound being present in stoichiometric weight equivalent amounts of sodium tetraborate pentahydrate of from about 2% to about 6% of the weight of the dry starch.

21. The settling aid of claim 20 wherein the boron compound is anhydrous sodium tetraborate.

22. A homogeneous free flowing settling aid useful in separating insoluble ore materials from a caustic aluminate liquor in the production of alumina, which consists essentially of the aqueous reaction product of 20 to 60 grams of starch per liter, 10 to 200 grams of caustic soda per liter, and hydrated sodium tetraborate, said hydrated sodium tetraborate being present in stoichiometric weight equivalent amounts of sodium tetraborate pentahydrate of from about 2% to about 6% of the weight of the dry starch.

23. The settling aid of claim 22 wherein the hydrated sodium tetraborate is sodium tetraborate pentahydrate.

24. The settling aid of claim 23 wherein the sodium tetraborate pentahydrate is present in amounts of 4 to 5% of the dry weight of the starch.

25. The settling aid of claim 22 wherein the hydrated sodium tetraborate is sodium tetraborate decahydrate.

26. The settling aid of claim 25 wherein the sodium tetraborate decahydrate is present in amounts of 5.24 to 6.55% of the dry weight of the starch.

27. The homogeneous, free flowing settling aid useful in separating insoluble ore materials from a caustic aluminate liquor in the production of alumina, which consists essentially of the aqueous reaction product of 20 grams of starch per liter, 55 grams of caustic soda per liter, and 0.8 grams of sodium tetraborate pentahydrate per liter.

28. A homogeneous, free flowing settling aid useful in separating insoluble ore materials from a caustic aluminate liquor in the production of alumina, which consists essentially of the aqueous reaction product of 20 grams of starch per liter, 55 grams of caustic soda per liter, and 1.08 grams of sodium tetraborate decahydrate per liter.

29. A homogeneous, free flowing settling aid useful in separating insoluble ore materials from a caustic aluminate liquor in the production of alumina, which consists essentially of the aqueous reaction product of 20 grams of starch per liter, 55 grams of caustic soda per liter, and 0.69 grams of sodium tetraborate per liter.

References Cited in the file of this patent

UNITED STATES PATENTS

| | | |
|---|---|---|
| 2,280,998 | Brown | Apr. 28, 1942 |
| 2,468,207 | Kerr | Apr. 26, 1949 |
| 2,609,328 | Reed | Sept. 2, 1952 |
| 2,610,136 | Casey et al. | Sept. 9, 1952 |

OTHER REFERENCES

Chemistry and Industry of Starch, edited by Kerr, Ralph W., Academic Press Inc., publishers, 1944, pages 58, 446–448.

UNITED STATES PATENT OFFICE

CERTIFICATE OF CORRECTION

Patent No. 2,935,377　　　　　　　　　　　　　　May 3, 1960

Robert L. Jones

It is hereby certified that error appears in the printed specification of the above numbered patent requiring correction and that the said Letters Patent should read as corrected below.

Column 2, line 65, for "gtiven" read -- given --; column 4, line 13, for "garms" read -- grams --; line 73, for "An" read -- At --; column 6, line 62, for "by" read -- of the --.

Signed and sealed this 4th day of April 1961.

(SEAL)
Attest:　ERNEST W. SWIDER

XXXXXXXXXX
Attesting Officer

ARTHUR W. CROCKER
Acting Commissioner of Patents